(12) United States Patent
Liu et al.

(10) Patent No.: US 12,539,498 B2
(45) Date of Patent: Feb. 3, 2026

(54) ANIMAL FAT GRADING DEVICE USING SUPERHEAT STEAM AND USING METHOD THEREOF

(71) Applicant: Northeast Agricultural University, Harbin (CN)

(72) Inventors: Qian Liu, Harbin (CN); Baohua Kong, Harbin (CN); Xin Li, Harbin (CN); Qian Chen, Harbin (CN); Chuanai Cao, Harbin (CN); Hui Wang, Harbin (CN); Haotian Liu, Harbin (CN); Yangyang Feng, Harbin (CN); Sumeng Wei, Harbin (CN); Fengxue Zhang, Harbin (CN)

(73) Assignee: Northeast Agricultural University, Harbin (CN)

( * ) Notice: Subject to any disclaimer, the term of this patent is extended or adjusted under 35 U.S.C. 154(b) by 722 days.

(21) Appl. No.: 17/878,743

(22) Filed: Aug. 1, 2022

(65) Prior Publication Data
US 2023/0203398 A1 Jun. 29, 2023

(30) Foreign Application Priority Data
Dec. 28, 2021 (CN) .......................... 202111627752.7

(51) Int. Cl.
*B01F 27/191* (2022.01)
*A22B 5/00* (2006.01)
*B01F 29/81* (2022.01)
*B28C 7/16* (2006.01)

(52) U.S. Cl.
CPC .......... *B01F 27/191* (2022.01); *A22B 5/0064* (2013.01); *B01F 29/81* (2022.01); *B28C 7/16* (2013.01)

(58) Field of Classification Search
CPC ............................. B01F 27/191; A22B 5/0064
USPC ......................................................... 422/285
See application file for complete search history.

(56) References Cited

FOREIGN PATENT DOCUMENTS

CN 208667640 U * 3/2019

OTHER PUBLICATIONS

English Translation of Chinese Document Identification No. CN 208667640 U provided by the United States Patent Office search tool Search: Feng, Xu-shan; An Animal Oil Processing Device; Mar. 29, 2019 (Year: 2019).*

* cited by examiner

*Primary Examiner* — Kevin Joyner
(74) *Attorney, Agent, or Firm* — Westbridge IP LLC

(57) ABSTRACT

Disclosed are an animal fat grading device using superheated steam and a method. The device comprises a bracket, a material container, a steam heating assembly, an oil leakage assembly, a pressing part, an oil pumping assembly, a switch structure and a controller, where an upper part of the bracket is fixedly connected with the material container, a top side wall and a bottom side wall of the material container are provided with the steam heating assembly; an inside is slidably connected with the oil leakage assembly; a top of the oil leakage assembly is fixedly connected with the pressing part; a top surface of the oil leakage assembly is fixedly connected with the oil pumping assembly, a bottom of the material container is communicated with an oil discharging pipe, the switch structure is arranged on the oil discharging pipe, and a temperature sensor is arranged in the material container.

9 Claims, 6 Drawing Sheets

ANIMAL FAT GRADING DEVICE USING SUPERHEAT STEAM AND USING METHOD THEREOF

CROSS-REFERENCE TO RELATED APPLICATIONS

This application claims priority to Chinese Patent Application No. 202111627752.7, filed on Dec. 28, 2021, the contents of which are hereby incorporated by reference.

TECHNICAL FIELD

The present application relates to the technical field of fat processing, and in particular to an animal fat grading device using superheated steam and a using method thereof.

BACKGROUND

Oils and fats are usually composed of saturated fatty acids and unsaturated fatty acids. The saturated fatty acids refer to fatty acid without unsaturated double bonds, which is a kind of fatty acid without unsaturated bonds in the carbon chain, and is one of basic components of lipids. Unsaturated fatty acids are fatty acids other than the saturated fatty acids. The unsaturated fatty acids are a kind of fatty acid that constitutes body fat, and are indispensable to human body. Animal fats and oils, such as of cattle, sheep and pigs, contain both saturated fatty acids and unsaturated fatty acids. Nowadays, people advocate a healthy diet. Because animal fat contains more unsaturated fatty acids and corresponding equipment to extract the unsaturated fatty acids is not available, people consume less animal fat, thus leading to a waste of animal fat.

SUMMARY

The objectives of the present application are to provide an animal fat grading device using superheated steam and using method thereof, so as to solve the above problems, separate unsaturated fatty acids in animal fat, distinguish quality of different fats, and facilitate to further utilize fats with different content of saturated fatty acids.

To achieve the above objectives, the present application provides the following solutions:

An animal fat grading device using superheated steam includes a bracket, a material container, a steam heating assembly, an oil leakage assembly, a pressing part, an oil pumping assembly, a switch structure and a controller, where an upper part of the bracket is fixedly connected with the material container; a top side wall and a bottom side wall of the material container are provided with the steam heating assembly; an inside of the material container is slidably connected with the oil leakage assembly; a top of the oil leakage assembly is fixedly connected with the pressing part; the pressing part makes the oil leakage assembly move up and down, a top surface of the oil leakage assembly is fixedly connected with the oil pumping assembly, a bottom of the material container is communicated with an oil discharging pipe, the oil discharging pipe is provided with the switch structure, the oil material container is internally provided with a temperature sensor, and the pressing part, the oil pumping assembly, the switch structure and the temperature sensor are electrically connected with the controller.

Optionally, the steam heating assembly comprises a steam channel arranged on side wall of the material container, one end of the steam channel is communicated with a steam inlet, the other end of the steam inlet is communicated with a steam outlet, the steam inlet and the steam outlet are arranged on the side wall of the material container, and the steam channel is spirally arranged on the side wall of the material container.

Optionally, a plurality of heating rods are fixedly connected to a bottom of an inner side of the material container, a heating channel is arranged in the heating rods, and two ends of the heating channel are connected in series in a middle of the steam channel.

Optionally, the oil leakage assembly comprises a piston slidably connected to the inner side of the material holing barrel, an outer side of the piston is attached to the inner wall of the material container, a bottom surface of the piston is fixedly connected with a filter screen, the piston is provided with a plurality of oil leakage holes, the pressing part is fixedly connected to a top center of the piston, and the oil pumping assembly is fixedly connected to a top surface of the piston.

Optionally, the piston is provided with a plurality of via holes, positions of the via holes and the heating rods correspond, and inner diameters of the via holes are matched with outer diameters of the heating rods.

Optionally, the oil pumping assembly comprises a plurality of oil outlet pipes. A side wall of one end of each pipe is fixedly connected to the top surface of the piston, each oil outlet pipe is provided with a flowmeter and an oil pump, and the other end of each oil outlet pipe is communicated with an oil storage barrel, and each flowmeter and each oil pump are electrically connected with the controller.

Optionally, the pressing part comprises a screw fixedly connected to a center of the top surface of the piston, the top surface of the material container is fixedly connected with a fixing frame, a side wall of the screw is provided with a keyway, a middle part of the fixing frame is provided with a screw via hole, an inner wall of the screw via hole is provided with a key, the screw is vertically and slidably connected with the fixing frame through the keyway and the key, a middle part of the fixing frame is rotatably connected with a first gear, and the first gear is screwed outside the screw. The first gear is meshed with a second gear, a second gear shaft is connected with a lifting motor, the lifting motor is fixedly connected with a fixing bracket, the fixing bracket is fixedly connected with a top of the fixing frame, and the lifting motor is electrically connected with the controller.

Optionally, the switch structure comprises a baffle, the baffle is horizontally and slidably connected at a bottom outlet of the material container, and one side of the baffle is fixedly connected with a piston end of a cylinder; the cylinder is horizontally arranged, and the cylinder is fixedly connected with a cylinder bracket; the cylinder bracket is fixedly connected with the bottom of the material container.

A using method of an animal fat grading device using superheated steam comprises following steps:

S1, putting animal fat into the material container in a closed state of the switch structure;

S2, heating the material container by using the steam heating assembly under different gradient temperature conditions;

S3, getting melted fat pass through the oil leakage assembly by running the pressing part after heating in S2, and be positioned above the oil leakage assembly;

S4, pumping out fat at different temperature gradients above the oil leakage assembly by the oil pumping assembly and storing; and S5, opening the switch structure and discharging part of unmelted animal fat under a highest temperature gradient through the oil discharging pipe under the extrusion of the oil leakage assembly.

The present application has the following technical effects:

The animal fat is put into the material container, the steam heating assembly is connected with steam equipment, and the temperature sensor is used to detect the temperature in the barrel. When a temperature in the material container meets a minimum temperature gradient, the animal fat in the material container is partially melted, and the controller controls the pressing part to run, and the pressing part pushes the oil leakage assembly downward, and a melted fat is above the oil leakage assembly after passing through the oil leakage assembly. At this time, the controller controls the oil pumping assembly to pump out the melted fat and after pumping, the temperature in the material container is increased by steam equipment. When the temperature reaches a second temperature gradient, the controller controls the pressing part to continue moving downward, and then controls the oil pumping assembly to pump out the fat under the second temperature gradient, so as to classify animal fat. When the material container reaches the highest temperature gradient, some animal fat is melted. At this time, the controller controls the switch structure to open, and controls the pressing part to continue moving downward. The pressing part pushes the oil leakage assembly downward, and extrudes remaining animal fat through the oil discharging pipe.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labor.

DETAILED DESCRIPTION OF THE EMBODIMENTS

Figure 1:
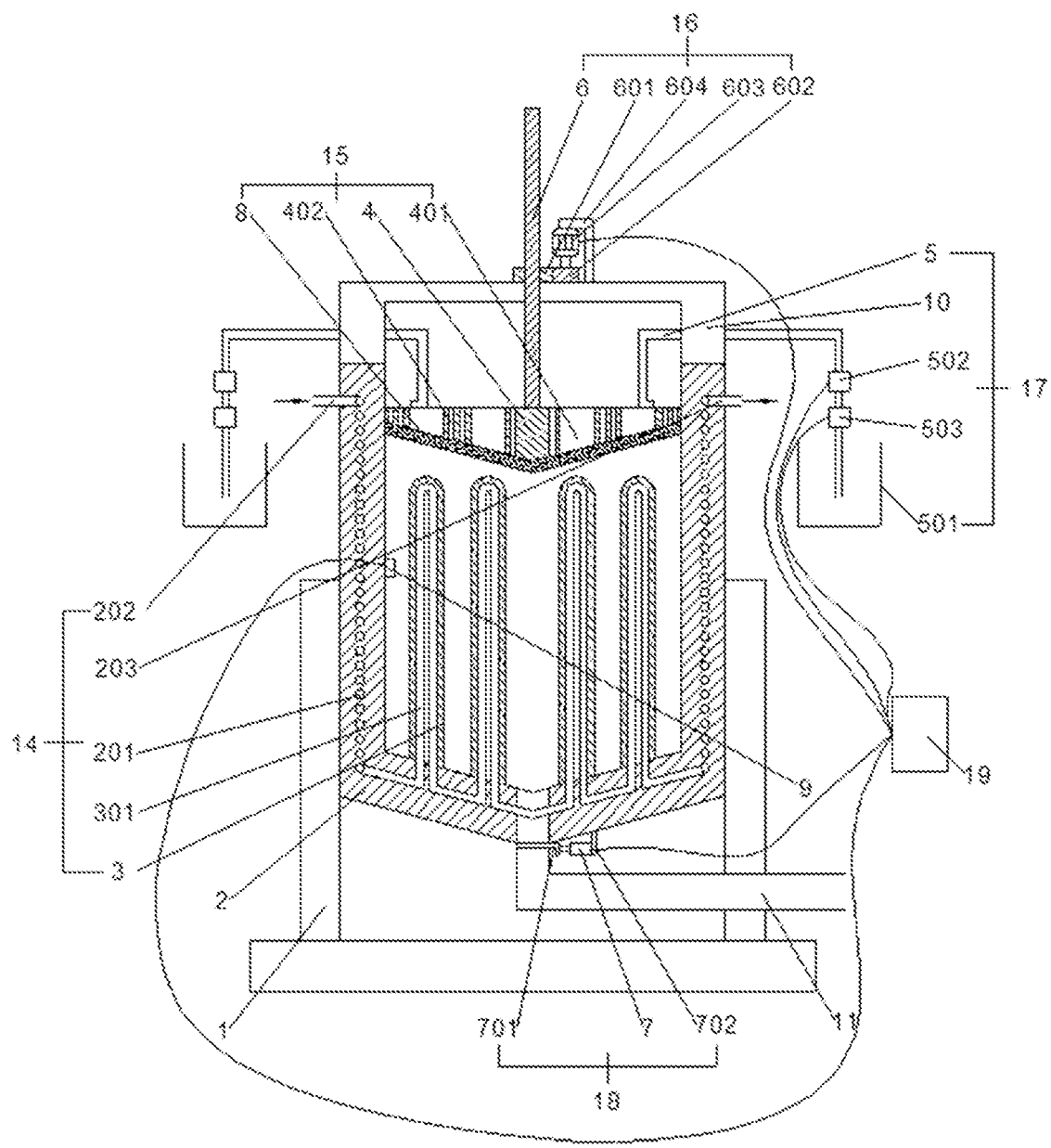
FIG. 1 is a schematic structural diagram of the present application.
Figure 2:
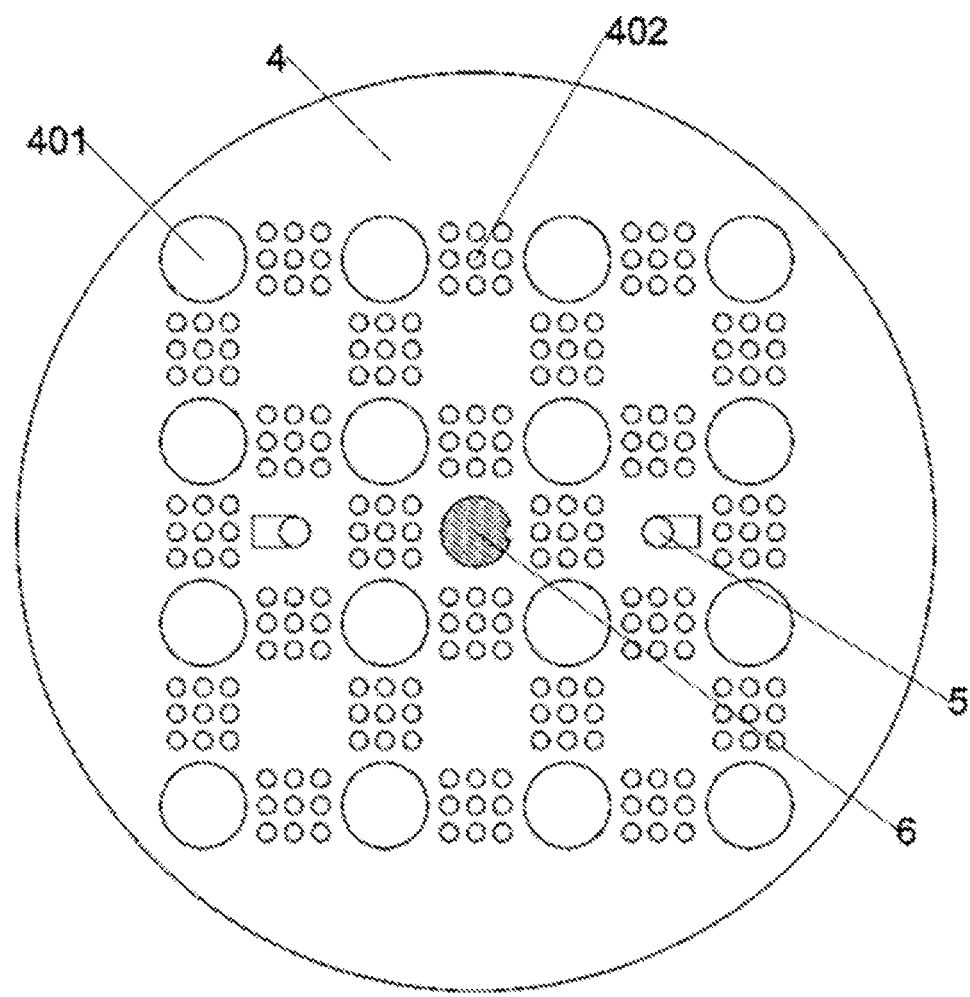
FIG. 2 is a top view of a piston.
Figure 3:
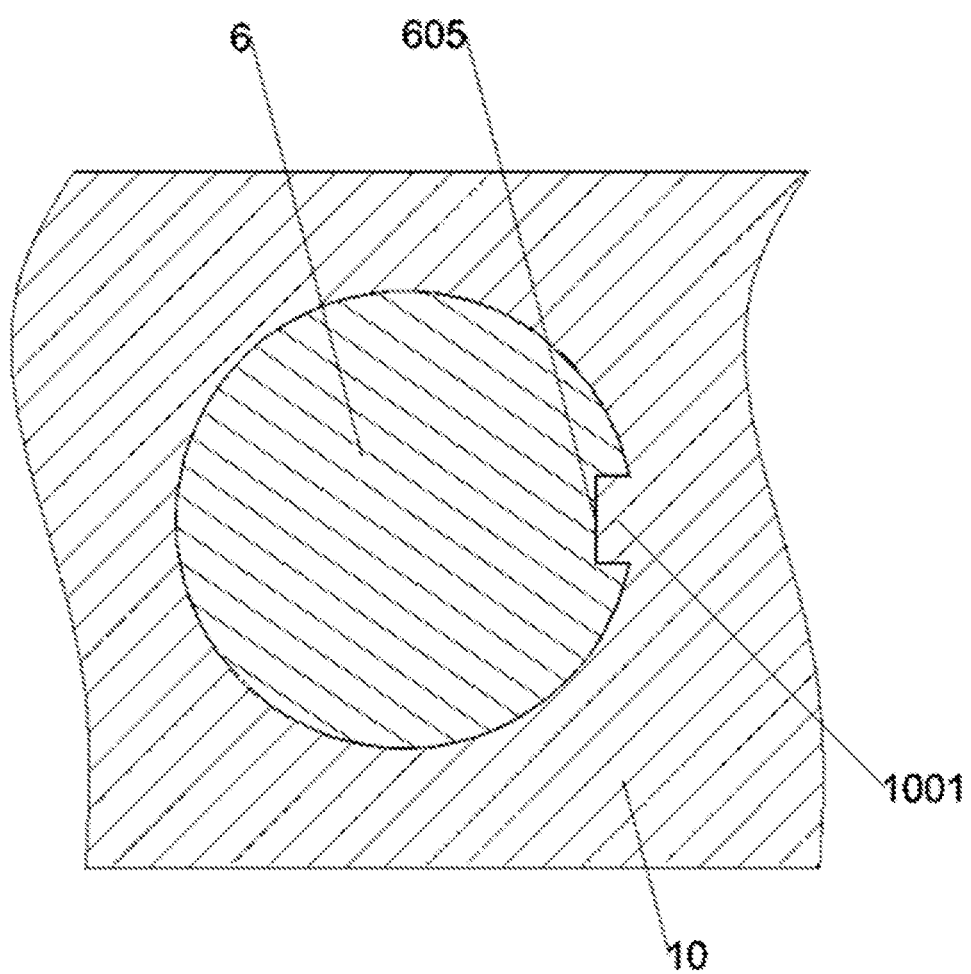
FIG. 3 is a schematic diagram of a matching structure of a screw and a fixing frame.
Figure 4:
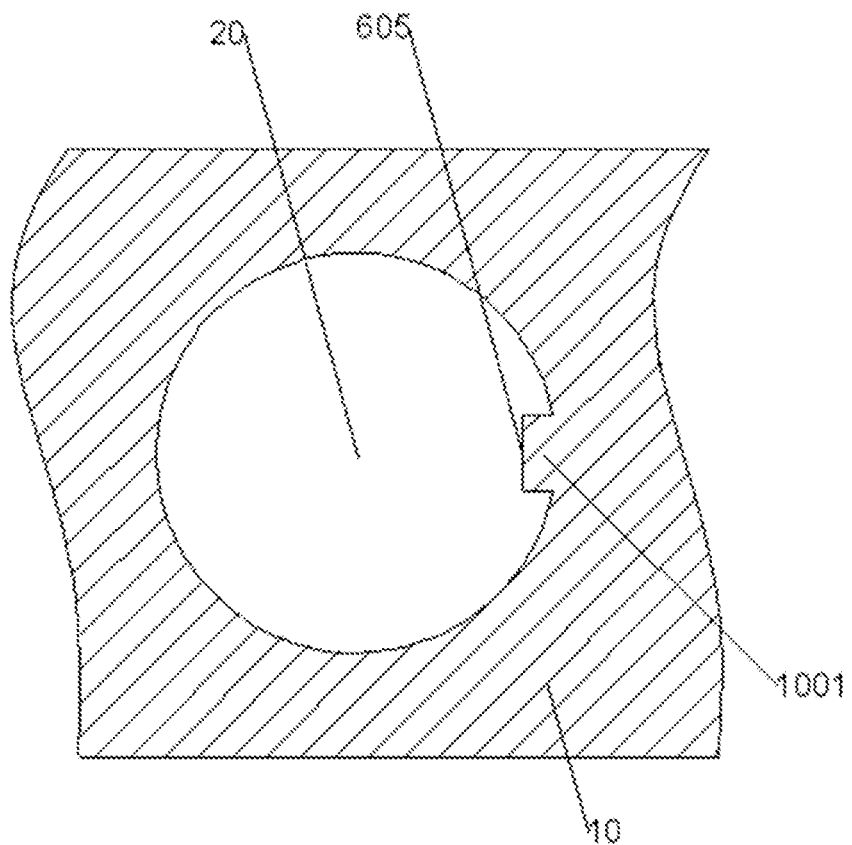
FIG. 4 is the structural diagram of screw via holes.

The technical solutions in the embodiments of the present application will be clearly and completely described below with reference to the drawings in the embodiments of the present application. Obviously, the described embodiments are only part of the embodiments of the present application, but not all of them. Based on the embodiments of the present application, all other embodiments obtained by ordinary technicians in the field without creative labor are within the scope of the present application.

In order to make the above objects, features and advantages of the present application more obvious and understandable, the present application will be explained in further detail below with reference to the drawings and detailed description.

Embodiment 1

With reference to FIGS. 1-4 and FIG. 6, this embodiment provides an animal fat grading device using superheated steam. The animal fat grading device using superheated steam comprises a bracket 1, a material container 2, a steam heating assembly 14, an oil leakage assembly 15, a pressing part 16, an oil pumping assembly 17, a switch structure 18 and a controller 19. An upper part of the bracket 1 is fixedly connected with the material container 2, and a top side wall and a bottom side wall of the material container 2 are provided with the steam heating assembly 14, and an inside of the material container 2 is slidably connected with the oil leakage assembly 15. A top of the oil leakage assembly 15 is fixedly connected with the pressing part 16, the pressing part 16 make the oil leakage assembly 15 move up and down, and a top surface of the oil leakage assembly 15 is fixedly connected with the oil pumping assembly 17. A bottom of the material container 2 is connected with an oil discharging pipe 11, the oil discharging pipe 11 is provided with the switch structure 18. The material container 2 is internally provided with a temperature sensor 9, and the pressing part 16, the oil pumping assembly 17, the switch structure 18 and the temperature sensor 9 are electrically connected with the controller 19.

The animal fat is put into the material container 2, and the steam heating assembly 14 is connected with a steam device and a temperature sensor 9 is used to detect the temperature in the material container 2. When the temperature in the material container 2 meets the minimum temperature gradient, fat in the material container 2 is partially melted, the controller 19 controls the pressing part 16 to run, and the pressing part 16 pushes the oil leakage assembly 15 downward, and a melted fat is located above the oil leakage assembly 15 after passing through the oil leakage assembly 15. At this time, the controller 19 controls the oil pumping assembly 17 to pump out the melted fat. After the pumping is completed, the temperature in the material container 2 is increased by steam equipment. When the temperature reaches a second temperature gradient, the controller 19 controls the pressing part 16 to continue moving downward, and then controls the oil pumping assembly 17 to pump out the oil under the second temperature gradient, so as to classify animal fat. When the material container 2 reaches a highest temperature gradient, part of the animal fat is melted. At this time, the controller 19 controls the switch structure 18 to open and controls the pressing part 16 to continue moving downward. The pressing part 16 pushes the oil leakage assembly 15 downward, and remaining animal fat is extruded through the oil discharging pipe 11.

In a further optimized scheme, the steam heating assembly 14 includes a steam channel 201 opened in the side wall of the material container 2. One end of the steam channel 201 is connected with a steam inlet 202, and the other end of the steam inlet 202 is connected with a steam outlet 203. The steam inlet 202 and the steam outlet 203 are opened on the side wall of the material container 2, and the steam channel 201 is spirally arranged on the side wall of the material container 2.

The steam inlet 202 is communicated with an exhaust port of the steam equipment, and the steam outlet 203 is used for discharging steam. The steam passes through the steam channel 201 and heats the holding barrel 2, and the holding barrel 2 heats the animal fat inside.

In a further optimized scheme, a bottom of an inner side of the material container 2 is fixedly connected with a plurality of heating rods 3, and a heating channel 301 is provided in the heating rods 3, both ends of the heating rods re connected in series in a middle of the steam channel 201.

By arranging the heating rods 3 in the material container 2, the animal fat in the material container 2 is melted faster, and the melting efficiency is improved.

In a further optimized scheme, the oil leakage assembly 15 comprises a piston 4 slidably connected to the inner side of the material container 2, and an outside of the piston 4 is attached to the inner wall of the material holing barrel 2, a bottom surface of the piston 4 is fixedly connected with a filter screen 8, and the piston 4 is provided with a plurality of the oil leakage hole 402, the pressing part 16 is fixedly connected to a top center of the piston 4, and the oil pumping assembly 17 is fixedly connected to a top surface of the piston 4.

The melted animal fat is filtered by the filter screen 8, and unmelted fat is left under the piston 4, the melted fat flows above the piston 4 through the oil leakage hole 402, and then is pumped out by the oil pumping assembly 17.

In a further optimized scheme, the piston 4 is provided with a plurality of via holes 401, and the positions of the via holes 401 and the heating rods 3 correspond, the inner diameters of the via holes 401 match the outer diameters of the heating rods 3.

In a further optimized scheme, the oil pumping assembly 17 includes a plurality of oil outlet pipes 5. A side wall of one end of each oil outlet pipe is fixedly connected to the top surface of the piston 4. Each oil outlet pipe 5 is provided with a flowmeter 502 and an oil pump 503, and the other end of each oil outlet pipe 5 is connected with an oil storage barrel 501. Each flowmeter 502 and each oil pump 503 are electrically connected with the controller 19. The oil outlet pipes 5 are hoses, which facilitates to lift and lower the piston 4.

After the melted fat flows above the piston 4, the controller 19 controls the oil pump 503 to operate, oil pump 503 pumps the melted fat into the oil storage barrel 501. Each flowmeter 502 is used to detect whether there is any oil in each oil outlet pipe 5. When no oil is detected, it means that all the melted fat is pumped out, and a signal is transmitted to the controller 19, the controller 19 controls the pressing part 16 to stop running, so that the piston 4 stops pressing. Quantity of oil outlet pipes 5 is based the temperature gradients. For example, when the temperature gradients are set to five, the quantity of oil outlet pipes 5 is set to five.

In a further optimized scheme, the pressing part 16 includes a screw 6 fixedly connected to a center of the top surface of the piston 4, a fixing frame 10 is fixedly connected to the top surface of the material container 2, a keyway 605 is opened on a side wall of the screw 6, a screw via hole 20 is opened in middle of the fixing frame 10, and a key 1001 is arranged on an inner wall of the screw via hole 20. The screw 6 is vertically and slidably connected to the fixing frame 10 through the keyway 605 and the key 1001, and a first gear 601 is rotatably connected to the middle of the fixing frame 10. The first gear 601 is screwed to an outside of the screw 6, the first gear 601 is engaged with a second gear 602, and the second gear 602 is axially connected with a lifting motor 603, the lifting motor 603 is fixedly connected with a fixing bracket 604, the fixing bracket 604 is fixedly connected with a top of the fixing frame 10, and the lifting motor 603 is electrically connected with the controller 19.

The controller 19 controls the lifting motor 603 to rotate, and the lifting motor 603 drives the second gear 602 to rotate. The second gear 602 drives the first gear 601 to rotate, and the first gear 601 drives the screw 6 to run up and down. The screw 6 pushes the piston 4 to move up and down.

In a further optimized scheme, the switch structure 18 includes a baffle 701. The baffle plate 701 is horizontally and slidably connected at a bottom outlet of the material container 2, one side of the baffle 701 is fixedly connected with a piston end of the cylinder 7, the cylinder 7 is horizontally arranged. The cylinder 77 is fixedly connected with a cylinder bracket 702, the cylinder bracket 702 is fixedly connected with the bottom of the material container 2.

The controller 19 controls the cylinder 7 to extend, and the cylinder 7 pushes the baffle 701 to move, and the baffle 701 blocks the bottom outlet of the material container 2. When the bottom outlet needs to be opened, the controller 19 controls the cylinder 7 to contract, and the baffle 701 moves from the bottom outlet the material container 2 to an edge to open the bottom outlet.

A using method of an animal fat grading device using superheated steam comprises the following steps:

S1, controlling the cylinder 7 to extend by the controller 19, and pushing the baffle 701 to move by the cylinder 7, blocking the bottom outlet of the material container 2 by the baffle and putting the animal fat into the material container 2;

S2, under different temperature gradients, heating the material container 2 with the steam heating assembly 14, where the temperature sensor 9 is used to detect the temperature in the material container 2, and when the temperature in the material container 2 meets the minimum temperature gradient, a part of the animal fat in the material container is melted;

S3, controlling the lifting motor 603 to rotate by the controller 19, and driving the second gear 602 to rotate by the lifting motor 603; driving the first gear 601 to rotate by the second gear 602, and driving the screw 6 to run up and down by the first gear 601, pushing the piston 4 downward by the screw 6, and filtering the melted animal fat by the filter screen 8, leaving the unmelted fat under the piston 4, and getting the melted fat flow above the piston 4 through the oil leakage hole 402;

S4, controlling the oil pump 503 to operate by the controller 19, pumping the melted fat into the oil storage barrel 501 by the oil pump 503, detecting whether there is oil in the oil outlet pipe 5 and transmitting a signal to the controller 19 when no oil is detected with a flowmeter 502, and controlling the pressing part 16 to stop running by the controller 19, so that the piston 4 stops pressing; and S5, under the highest temperature gradient, there being some animal fat unmelted, controlling the cylinder 7 to contract by the controller 19, so that the baffle 70 moves from the bottom outlet of the material container 2 to the edge, controlling the lifting motor 603 to rotate by the controller 19, driving the second gear 602 to rotate by the lifting motor 603, driving the first gear 601 to rotate by the second gear 602, and driving the screw 6 to run up and down by the first gear 601, pushing the piston 4 to continue moving down by the screw 6, and discharging the unmelted fat through the oil discharging pipe 11.

Embodiment 2

Figure 5:
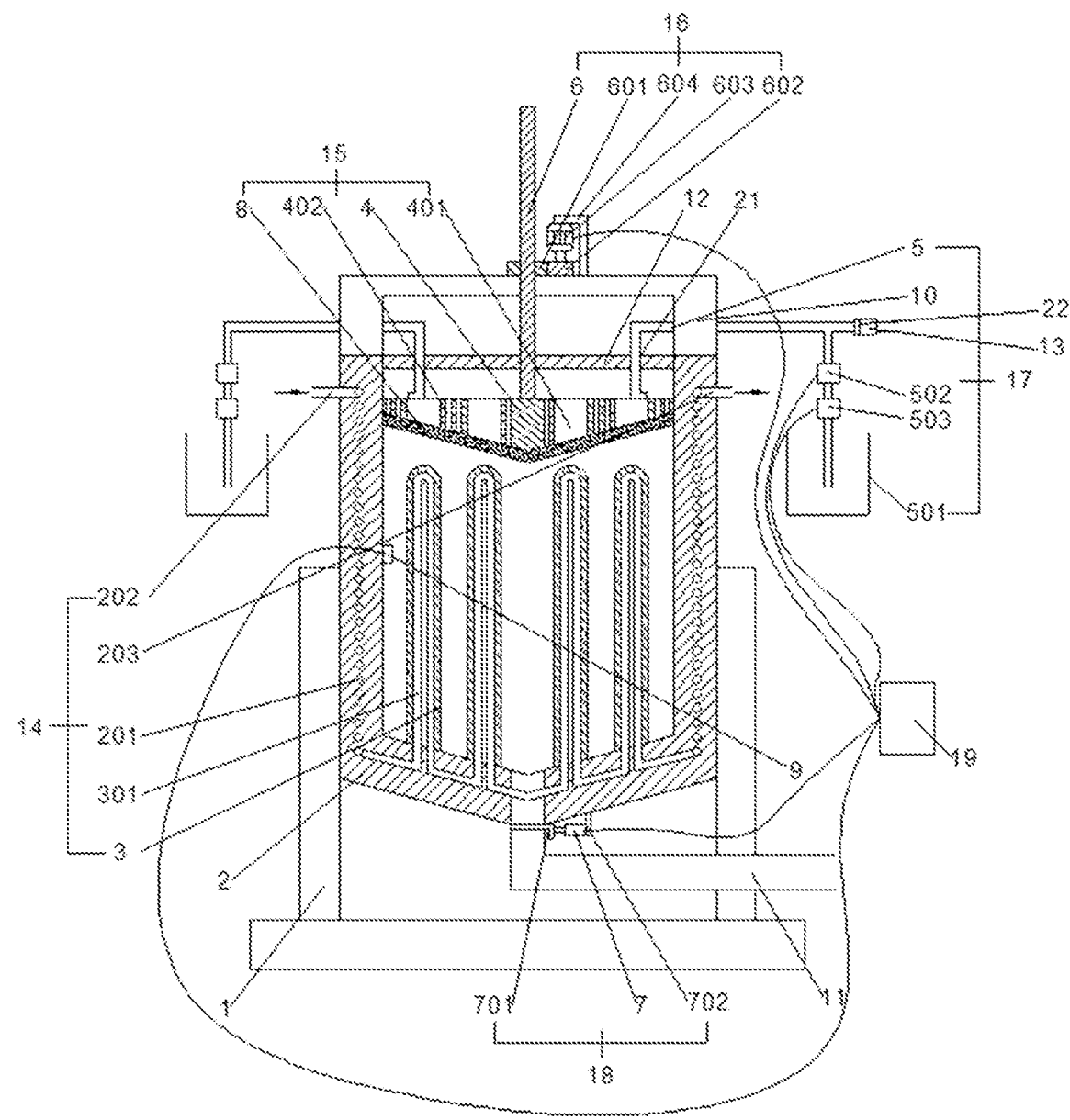
FIG. 5 is a structural diagram of Embodiment 2 of the present application.
Figure 6:
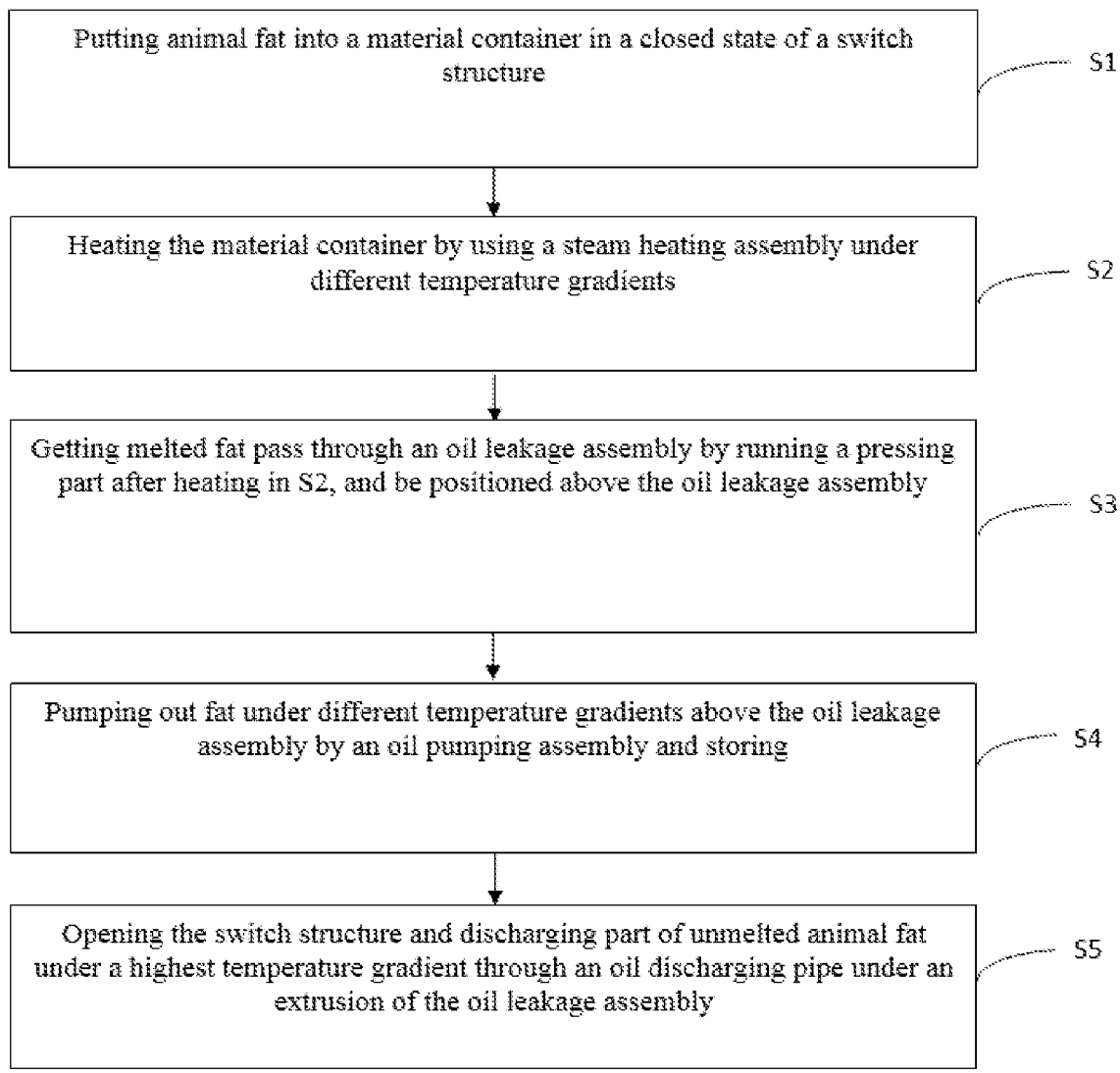
FIG. 6 is a flow chart of a method according to the present application.

With reference to FIG. 5, a difference between this embodiment and the embodiment 1 is that each oil outlet pipe 5 is communicated with an air pump 13. The top of the material container 2 is detachably connected with a sealing cover 12, the sealing cover 12 is provided with a pipeline via hole 21 and each oil outlet pipe 5 passes through the pipeline via hole 21, and an outlet end of each air pump 13 is provided with an sealing cover 12 valve 22.

When oil is pumped through the oil outlet pipes 5, the solenoid valve 22 is closed, and remaining unmelted fat is discharged under extrusion of the piston 4. When the piston 4 travels to the very bottom, the remaining fat in the oil discharging pipe 11 is in an unmelted state, the fat is accumulated in the oil discharging pipe 11. At this time, the sealing cover 12 covers the top of the material container 2, and the material container 2 is in a closed state inside, the electromagnetic valve 22 is opened, and the air pump 13 is controlled to run, and the air pump 13 introduces external air into the material container 2, so that the remaining fat in the oil discharging pipe 11 is cleared away.

In the description of the present application, it should be understood that the orientation or positional relationship indicated by terms "longitudinal", "transverse", "upper", "lower", "front", "rear", "left", "right", "vertical", "horizontal", "top", "bottom", "inner", "outer", etc. is based on the orientation or positional relationship shown in the drawings, and is only for the convenience of describing the present application, rather than indicating or implying that the device or element referred to must have a particular orientation, be constructed and operate in a particular orientation, and therefore should not be understood as limiting the application.

The above-mentioned embodiments only describe the preferred mode of the present application, but do not limit the scope of the application. On the premise of not departing from the design spirit of the present application, all kinds of modifications and improvements made by ordinary technicians in the field to the technical scheme of the application shall fall within the scope of protection determined by the claims of the application.

What is claimed is:

1. An animal fat grading device using superheated steam, comprising a bracket, a material container, a steam heating assembly, an oil leakage assembly, a pressing part, an oil pumping assembly, a switch structure and a controller, wherein
an upper part of the bracket is fixedly connected with the material container, a top side wall and a bottom side wall of the material container are provided with the steam heating assembly, an inside of the material container is slidably connected with the oil leakage assembly, a top of the oil leakage assembly is fixedly connected with the pressing part, the pressing part makes the oil leakage assembly move up and down, a top surface of the oil leakage assembly is fixedly connected with the oil pumping assembly, a bottom of the material container is communicated with an oil discharging pipe, the oil discharging pipe is provided with the switch structure, the material container is internally provided with a temperature sensor, and the pressing part, the oil pumping assembly, the switch structure and the temperature sensor are electrically connected with the controller.

2. The animal fat grading device using superheated steam according to claim 1, wherein the steam heating assembly comprises a steam channel arranged on a side wall of the material container, one end of the steam channel is communicated with a steam inlet, the other end of the steam inlet is communicated with a steam outlet, the steam inlet and the steam outlet are arranged on the side wall of the material container, and the steam channel is spirally arranged on the side wall of the material container.

3. The animal fat grading device using superheated steam according to claim 2, wherein a plurality of heating rods are fixedly connected to a bottom of an inner side of the material container, a heating channel is arranged in the heating rods, and two ends of the heating channel are connected in series in a middle of the steam channel.

4. The animal fat grading device using superheated steam according to claim 3, wherein the oil leakage assembly comprises a piston slidably connected to the inner side of the material container, an outer side of the piston is attached to the inner wall of the material container, a bottom surface of the piston is fixedly connected with a filter screen, the piston is provided with a plurality of oil leakage holes, the pressing part is fixedly connected to a top center of the piston, and the oil pumping assembly is fixedly connected to a top surface of the piston.

5. The animal fat grading device using superheated steam according to claim 4, wherein the piston is provided with a plurality of via holes, positions of the via holes and the heating rods correspond to each other, and inner diameters of the via holes are matched with outer diameters of the heating rods.

6. The animal fat grading device using superheated steam according to claim 4, wherein the oil pumping assembly comprises a plurality of oil outlet pipes, a side wall of one end of each pipe is fixedly connected to the top surface of the piston, each oil outlet pipe is provided with a flowmeter and an oil pump, and the other end of each oil outlet pipe is communicated with an oil storage barrel, and each flowmeter and each oil pump are electrically connected with the controller.

7. The animal fat grading device using superheated steam according to claim 4, wherein the pressing part comprises a screw fixedly connected to a center of the top surface of the piston, the top surface of the material container is fixedly connected with a fixing frame, a side wall of the screw is provided with a keyway, a middle part of the fixing frame is provided with a screw via hole, an inner wall of the screw via hole is provided with a key, the screw is vertically and slidably connected with the fixing frame through the keyway and the key, a middle part of the fixing frame is rotatably connected with a first gear, and the first gear is screwed outside the screw, the first gear is meshed with a second gear, a second gear shaft is connected with a lifting motor, the lifting motor is fixedly connected with a fixing bracket, the fixing bracket is fixedly connected with a top of the fixing frame, and the lifting motor is electrically connected with the controller.

8. The animal fat grading device using superheated steam according to claim 1, wherein the switch structure comprises a baffle, the baffle is horizontally and slidably connected at a bottom outlet of the material container, one side of the baffle is fixedly connected with a piston end of a cylinder, the cylinder is horizontally arranged, the cylinder is fixedly connected with a cylinder bracket and the cylinder bracket is fixedly connected with the bottom of the material container.

9. A using method of the animal fat grading device using superheated steam according to claim 1, comprising:
- S1, putting animal fat into a material container in a closed state of a switch structure,
- S2, heating the material container by using a steam heating assembly under different temperature gradients;
- S3, getting melted fat pass through an oil leakage assembly by running a pressing part after heating in S2, and be positioned above the oil leakage assembly;
- S4, pumping out fat under different temperature gradients above the oil leakage assembly by an oil pumping assembly and storing; and
- S5, opening the switch structure and discharging part of unmelted animal fat under a highest temperature gradient through an oil discharging pipe under an extrusion of the oil leakage assembly.

* * * * *